July 4, 1961
N. W. STEELE
2,990,868
WHEEL TRACTION DEVICE
Filed June 25, 1959
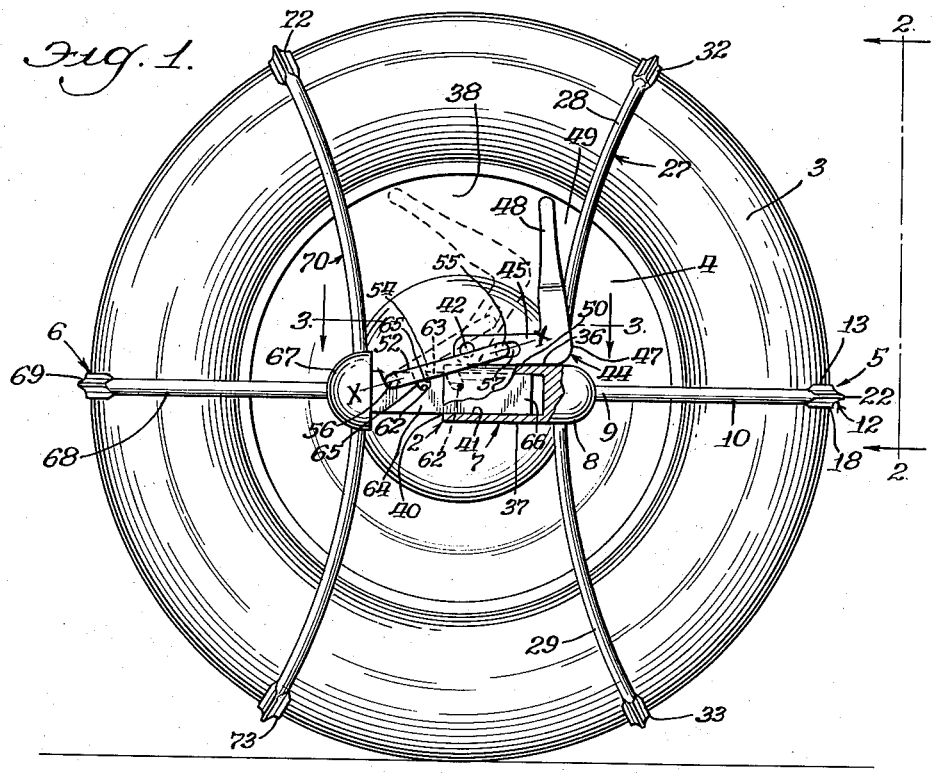
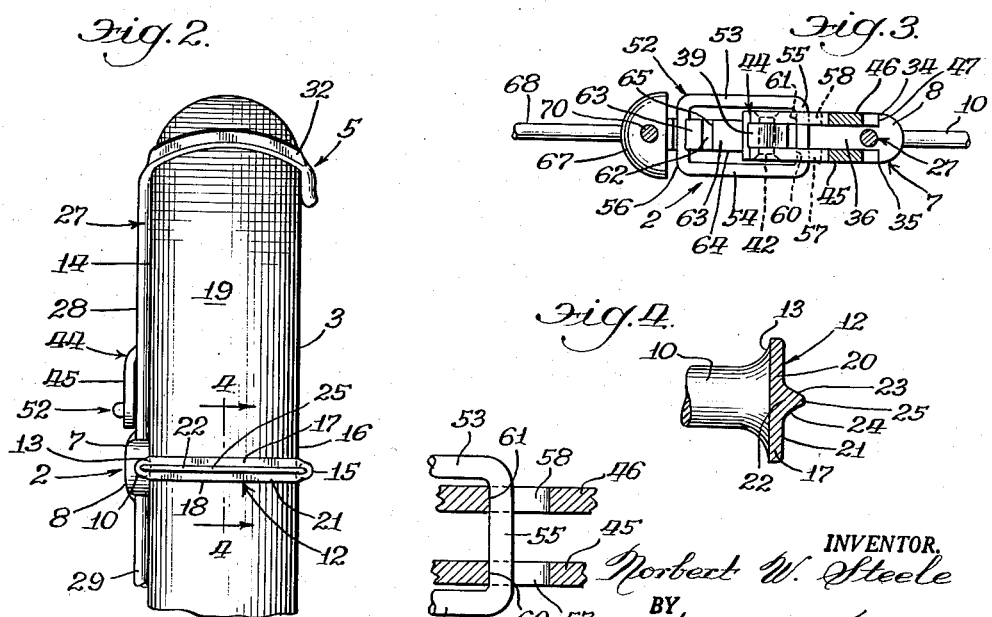
INVENTOR.
Norbert W. Steele
BY John J. Kowalik
Atty.

United States Patent Office 2,990,868
Patented July 4, 1961

2,990,868
WHEEL TRACTION DEVICE
Norbert W. Steele, 7742 W. North Shore Ave., Chicago, Ill.
Filed June 25, 1959, Ser. No. 822,826
3 Claims. (Cl. 152—218)

This invention relates to traction devices for vehicle wheels of the type particularly suited for quick application and removal to facilitate driving the vehicle out of snow and the like.

A general object of the invention is to provide a novel traction device of simple and rugged construction and which has a minimum of separate parts.

A further object is to devise a traction device comprising two relatively movable parts which are adapted to be placed upon a vehicle wheel in situ and without any tools.

A different object is to provide a traction device in which the parts are organized not only to provide a compact assembly in which the parts cooperate in an efficient manner but also one which will have universal application to several most popular tire sizes.

A different object is to provide a novel traction device comprising a pair of opposed sections, each section having a plurality of circumferentially spaced rigidly interconnected arms and the arms being arranged to react collectively against the tire to prevent high stress concentrations and injury to the tire carcass.

A more specific object is to devise a toggle latch for releasably connecting the two opposed parts, the latch including a bell-crank lever arm which has parts embracing one of the traction arms and shielded thereby to prevent accidental unlatching pursuant to forces developed upon rotation of the wheel.

The invention comprehends interlocking the opposed parts into a rigid structure in which the parts collectively develop the strength of the entire assembly.

These and other objectives and advantages will become more readily apparent from the specifications and the drawings, wherein:

FIGURE 1 is a side elevational view of the traction device shown applied to a pneumatic tired vehicle wheel with parts broken away and shown in section;

FIGURE 2 is a fragmentary end view taken substantially on line 2—2 of FIGURE 1;

FIGURE 3 is a sectional view taken approximately on line 3—3 of FIGURE 1;

FIGURE 4 is an enlarged sectional view taken essentially on line 4—4 of FIGURE 2; and FIGURE 5 is an enlarged fragmentary longitudinal sectional view through the bifurcated lever arm of the latch.

*Description of wheel traction device*

Describing the invention in detail and having particular reference to the drawings there is shown a tire traction lug device generally designated 2 which fits about the pneumatic tire 3 which is mounted upon a vehicle wheel 4.

The traction device comprises a pair of mating components 5 and 6, the part 5 comprising a socket portion 7 which is elongated and positioned radially and centrally with respect to the wheel center and has its radially outer end 8 integrally united to the inner end 9 of an arm 10 which extends radially outwardly and at its outer end is formed to provide a U-section or hook shaped end 12 having an outer leg 13 engaging the outer face 14 of the tire, and an inner leg 15 engaging the inner face 16 of the tire and an arcuate outwardly bowed bight portion 17 interconnecting the legs and complementally engaging as at 18 the periphery or tread 19 of the tire 3. The hook portion 12 is formed of somewhat rectangular section as seen at 20 and has a relatively flat outer side 21 with a longitudinal medial outwardly projecting rib 22 with tapering sides 23, 24 (FIG. 4) converging toward the vertex 25, the rib extending axially of the wheel and being effective to dig into the snow and the like to afford positive traction.

In addition to the arm 10, the component 5 comprises a unitary arm assembly generally designated 27 which includes a pair of arm members 28 and 29 which are formed as an arcuate bar which is bowed inwardly of the wheel and extends generally chordwise thereof; the intermediate portion of the bar extends through the outer end portion 8 of the socket member substantially perpendicular to the arm 10. It will be noted that the spacing between the arms 10, 28 and 10, 29 is approximately between 60° and 75° and that the distance between the hook portions 32 and 33 at the ends of bar 27 is less than the diameter of the wheel.

The socket portion is a substantially rectangular member having flat inner sides 34 and 35 and top and bottom sides 36 and 37, so that its width axially of the wheel is minimized whereby it readily fits within the pocket 38 formed by the outer dished contour of the wheel and surrounding tire. The top side 36 is provided with an upstanding lug 39 formed adjacent to the open end 40 of the pocket or cavity 41 of the socket and pivotally mounts on a pin 42 one end of a bifurcated leg structure of a locking bell crank 44 which in addition to the laterally spaced leg portions 45, 46 which flank the lug 39 and merge into an elbow 47 which in the locked position of the device embrace the arm 28, also comprises a lever arm 48 which provides a handle and is spaced from the arm 28 as shown at 49 (FIG. 1) to accommodate the user's hand for unlatching or unlocking the device as shown in phantom lines in FIGURE 1. It will be noted in FIGURE 1 that the leg portions 45 and 46 seat as at 50 against the top side 36 of the socket member and at the same time the neutral axis $x$—$x$ of the toggle latch or locking link 52 is below the center of the pin 42.

The latch 52 comprises a pair of inner and outer side links 53, 54 which in the locked position flank the socket member and are interconnected at their corresponding ends by the cross-links or pins 55, 56, the pin 55 extending through the transversely aligned slots 57, 58 in leg portions 45, 46, the slots 57, 58 being elongated lengthwise of the leg portions and affording a seat at one of their ends as at 60 and 61 for the cross-member 55.

The opposite ends of the links 53, 54 and are heretofore stated, interconnected to cross-pin 56 which selectively enters into any of a series of notches 62, 62 which are formed by the teeth 63, 63 which are integral with the tongue or bar or bolt member 64 which is generally rectangular in cross-section and complementally fits into the socket 41. Each tooth provides a side or edge or seat 65 which extends diagonally in a direction away from the socket member to prevent escape of the link 56.

The bolt 64 has its inner end 66 fitting into the socket and at its outer end is formed with an enlarged head 67 which connects to the inner end of the radial arm 68, the arm 68 having a hook shaped end 69 identical with hook end 12 and similarly engages the related portion of the tire. The chordwise extending arm assembly 70 is similar to assembly 27 and has its intermediate portion passing through the head 67 substantially perpendicular to arm 68, the bar assembly 70 being bowed inwardly and between its hook ends 72, 73 is shorter than the diameter of the wheel.

It will be understood that all of the hook ends are substantially identical and similarly embrace the tire and that they all are formed about a common radius so that each engages the tire with an indenting effect when the latch is locked. For various tire sizes the latch engages different notches as readily apparent and to accommodate these different sizes the arm assemblies 70 and 27 are made of spring steel so that they may readily adjust to the contour of the wheel and deflect toward the center until the radial or diametrical arms 10 and 68 engage their hook portions with the tire.

It will be observed that the arrangement is made such that it readily fits the smallest popular tire size with minimum deflection of the arm structures 27 and 70. The arrangement of the interlocked parts further insures in view of their rigid connections that the loads will be distributed about the entire tire so that the reactions will not injure the tire.

A further feature of the invention is in the arrangement of the bell crank so that the arm portions 45, 46 embrace with elbow 47 the arm 28. This prevents bending the arm away from the tire upon the handle end 48 plowing into the snow. It will also be noted that this handle is arranged in a position with respect to pin 42 and is in circumferential alignment with the arm 27 so that it will not be accidentally unlocked.

I claim:

1. A traction device for a wheel having a deflectible tire, a pair of mating tire-embracing structures each having a plurality of distal parts, and presenting traction lug means, one of said sections having a socket and the other section having a tongue telescoping into the socket and having a plurality of transversely directed teeth, a latch comprising a bell-crank lever having one leg pivoted at one end to said socket, a latch pivoted at one end to said one leg intermediate its ends and selectively engageable with respective teeth, said lever having a bifurcated elbow portion telescoping over a part of one of the structures in sheathing and interlocking relationship therewith.

2. A traction device for a wheel having a flexible tire, a pair of mating diametrically spaced traction sections embracing the wheel and each having a plurality of tire-engaging arms and a center portion integrally interconnecting the arms, locking means on said center portions in interlocking engagement with each other, one arm of each section being disposed in diametric alignment with a corresponding arm on the other section, and the other arms of each section being disposed at opposite sides of the one arm and converging toward the center section, and said locking means comprising teeth on one center portion, a bell-crank lever pivotally mounted on the other center portion and swingable toward and away with respect to the one center portion, a loop pivoted to said lever at one end and selectively engageable at its other end with respective teeth, said lever having a bifurcated elbow including a pair of laterally spaced segments receiving one of the said other arms of the related section therebetween for interlocking engagement therewith.

3. In a traction device for a wheel having a peripheral pneumatic tire, opposed traction devices about the wheel each comprising interconnected radial portion and chordal portion, said radial portion being rigid and extending from adjacent the center of the wheel to its outer periphery and having traction means engaging the wheel periphery, said chordal portion being a flexible bar having two ends with traction means engageable about the wheel periphery, said radial portion having inner ends in diametric alignment across the center of the wheel, and latch means interconnecting said devices solely at said inner end portion for drawing the devices embracingly about the wheel and said latch means having lost motion accommodating movement of said opposed devices inwardly of the wheel toward each other without stressing said latching means.

References Cited in the file of this patent
UNITED STATES PATENTS

| | | |
|---|---|---|
| 2,638,140 | Paulsen | May 22, 1953 |
| 2,880,776 | Rucker | Apr. 7, 1959 |
| 2,886,091 | Hines | May 12, 1959 |